United States Patent
Li

(10) Patent No.: US 8,880,684 B2
(45) Date of Patent: Nov. 4, 2014

(54) METHOD AND SYSTEM FOR MEASURING INDIVIDUAL NETWORK ROUND-TRIP DELAYS IN IP GATEWAYS

(75) Inventor: Gordon Yong Li, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 607 days.

(21) Appl. No.: 13/049,001

(22) Filed: Mar. 16, 2011

(65) Prior Publication Data

US 2012/0023224 A1    Jan. 26, 2012

Related U.S. Application Data

(60) Provisional application No. 61/366,991, filed on Jul. 23, 2010.

(51) Int. Cl.
  *G06F 15/16*    (2006.01)
  *H04L 29/06*   (2006.01)
  *H04L 12/26*   (2006.01)

(52) U.S. Cl.
  CPC ............ *H04L 43/0864* (2013.01); *H04L 69/28* (2013.01); *H04L 43/106* (2013.01)
  USPC .......................................... 709/224; 709/249

(58) Field of Classification Search
  USPC .................................................. 709/224, 249
  See application file for complete search history.

(56) References Cited

U.S. PATENT DOCUMENTS

| | | | |
|---|---|---|---|
| 6,363,056 B1 * | 3/2002 | Beigi et al. ..................... | 370/252 |
| 6,366,563 B1 * | 4/2002 | Weldon et al. ................. | 370/252 |
| 6,778,493 B1 * | 8/2004 | Ishii ............................... | 370/229 |
| 6,885,641 B1 * | 4/2005 | Chan et al. ..................... | 370/252 |
| 7,672,241 B2 * | 3/2010 | Foore et al. .................... | 370/235 |
| 7,729,268 B2 * | 6/2010 | Matta et al. .................... | 370/252 |
| 8,589,508 B2 * | 11/2013 | Harrang et al. ................ | 709/217 |
| 2004/0246907 A1 * | 12/2004 | Hoffmann ....................... | 370/252 |
| 2005/0018611 A1 * | 1/2005 | Chan et al. ..................... | 370/241 |
| 2007/0147245 A1 * | 6/2007 | Foore et al. .................... | 370/231 |
| 2010/0274872 A1 * | 10/2010 | Harrang et al. ................ | 709/217 |

* cited by examiner

*Primary Examiner* — Douglas Blair
(74) *Attorney, Agent, or Firm* — Foley & Lardner LLP

(57) ABSTRACT

An IP gateway, attached to a source network and a destination network, handles an application session between a source client device and a destination client device. Application-level control messages in the existing application session may be time stamped by the IP gateway. Individual network round-trip delays (RTDs) associated with the attached networks may be calculated or determined utilizing the resulting time stamps. The IP gateway may time stamp one or more of the application-level control messages in the existing application session whenever transmission and/or reception of the application-level control messages occurs at the IP gateway. The resulting gateway related time stamps such as the gateway-to-source receive time stamp and the gateway-to-destination transmit time stamp may be stored. An individual RTD associated with the destination network may be calculated or determined utilizing the stored gateway related time stamps and processing delay measurement extracted from one of the application-level control messages from the destination client device.

20 Claims, 5 Drawing Sheets

METHOD AND SYSTEM FOR MEASURING INDIVIDUAL NETWORK ROUND-TRIP DELAYS IN IP GATEWAYS

CROSS-REFERENCE TO RELATED APPLICATIONS/INCORPORATION BY REFERENCE

This patent application makes reference to, claims priority to and claims benefit from U.S. Provisional Application Ser. No. 61/366,991 filed on Jul. 23, 2010.

This application also makes reference to:
U.S. application Ser. No. 12/829,145 filed on Jul. 1, 2010,
U.S. application Ser. No. 12/829,179 filed on Jul. 1, 2010,
U.S. application Ser. No. 12/829,212 filed on Jul. 1, 2010,
U.S. application Ser. No. 12/828,549 filed on Jul. 1, 2010,
U.S. application Ser. No. 12/828,652 filed on Jul. 1, 2010,
U.S. application Ser. No. 12/837,045 filed on Jul. 15, 2010,
U.S. application Ser. No. 12/837,052 filed on Jul. 15, 2010, and
U.S. application Ser. No. 12/837,089 filed on Jul. 15, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for measuring individual network round-trip delays in IP gateways.

BACKGROUND OF THE INVENTION

Telecommunication technologies have evolved from analog to digital technologies, and continue to evolve from circuit switched to packet switched, from connection oriented packet switching to connectionless packet switching, and from narrowband application to broadband applications. The accompanied evolution in telecommunication technologies has significantly advanced operators' capability to offer broadband, IP-based multimedia services (IMS) ranging from entertainment and lifestyle applications such as mobile TV and mobile payment to professional services such as video conferencing and real-time data exchange.

IMS defines a standard framework for the deployment of next generation Web-based application services. IMS defines how these services connect and communicate with the underlying telecommunications network(s) and how they integrate with the network provider's back-end systems. IMS combines voice and data in one packet switched network such as, for example, the GPRS core network and the LTE core network, to offer network controlled multimedia services. Various Internet Protocols (IPs) such as the Session Initiation Protocol (SIP), the User Datagram Protocol (UDP), the Transmission Control Protocol (TCP) and Real-Time Transport Protocol (RTP) are widely utilized for delivery of various forms of multimedia applications over IP networks. SIP is an end-to-end application layer signaling protocol that is utilized to setup, modify, and teardown multimedia sessions such as audio/videoconferencing, interactive gaming, virtual reality, and call forwarding over IP networks. UDP and TCP are transport layer protocols that are used for data delivery over IP networks. TCP guarantees data delivery and integrity, however, UDP does not exclusively guarantee delivery of data. RTP is the Internet protocol which transports real-time data such as audio and video data. RTP does not exclusively guarantee real-time delivery of data, but it does provide mechanisms for the sending and receiving applications to support streaming and/or conversational data.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for measuring individual network round-trip delays in IP gateways, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for measuring individual network round-trip delays in IP gateways. In various embodiments of the invention, an IP gateway, attached to a source network and a destination network, is operable to handle an application session established between a source client device and a destination client device that are associated with the source network and the destination network, respectively. One or more application-level control messages in the existing application session may be time stamped. Individual network round-trip delays (RTDs) associated with the attached source and destination networks may be calculated or determined utilizing the resulting time stamps. A procedure to determine an end-to-end RTD over the existing application session may start at the source client device. One of the application-level control messages may be transmitted with a transmit origination time stamp from the source client device to the destination client device via the IP gateway. The IP gateway may time stamp the application-level control message upon reception. The transmit origination time stamp may be extracted from the received application-level control message and stored. The application-level control message may be processed for transmission to the destination client device. The processed application-level control message may be time stamped upon transmission utilizing a gateway destination transmit time stamp. Subsequently, the IP gateway may time stamp a response application-level control message received from the destination client device upon reception. The received response application-level control message may be compared with the transmit origination time stamp from the source client device for processing the response application-level control message from the destination client device. The processed response application-level control message may be time stamped utilizing a gateway source transmit time stamp. An individual RTD associated with the destination network may be calculated or determined utilizing the gateway destination receive time stamp, the gateway destination transmit time stamp and the processing delay measurement.

Figure 1:
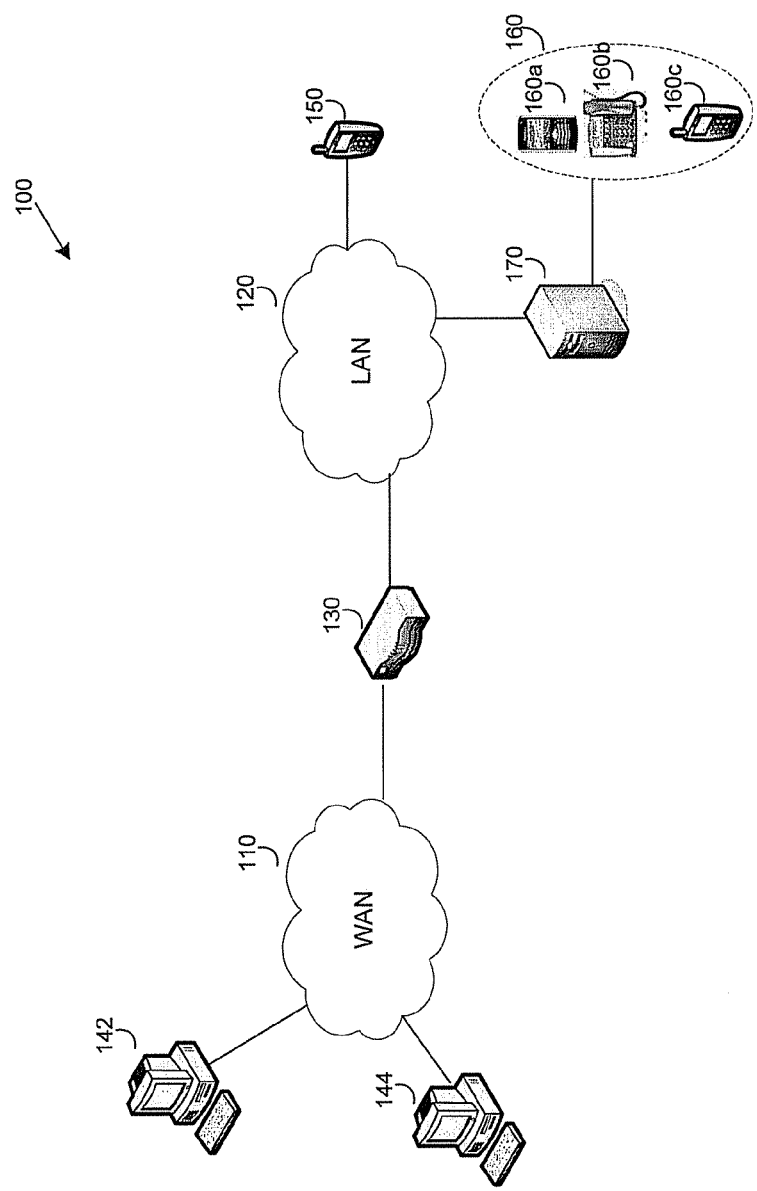
FIG. 1 is a diagram illustrating an exemplary communication system that is operable to measure individual network round-trip delays in an IP gateway utilizing application-level control messages in existing application sessions, in accordance with an embodiment of the invention.

FIG. 1 is a diagram illustrating an exemplary communication system that is operable to measure individual network round-trip delays in an IP gateway utilizing application-level control messages in existing application sessions, in accordance with an embodiment of the invention. Referring to FIG. 1, there is shown a communication system 100 comprising a wide area network (WAN) 110, a local area network (LAN) 120, an IP gateway 130, a plurality of client devices 142, 144, and 150-160, and a private branch exchange (PBX) 170.

The WAN 110 may comprise a computer network providing communications links that covers a broad area such as, for example, a metropolitan area, a regional area, and/or a national area.

The LAN 120 may comprise a computer network that connects computers and devices in a limited geographical area such as home, school, computer laboratory and/or office building.

The IP gateway 130 may comprise suitable logic, circuitry, interfaces and/or code that are operable to route and distribute data and signaling messages among client devices registered to the IP gateway 130 through attached networks such as the WAN 110 and/or the LAN 120. The IP gateway 130 may be coupled with the WAN 110 as well as the LAN 120 to route data and signaling messages to support communications of services of interest. In this regard, the IP gateway 130 may be operable to route application-level data and control messages in at least one application session between, for example, the client device 142 and the client device 150. An application session between the client device 142 and the client device 150, for example, is referred to a logical grouping of related protocol sessions (connections) that stores application-specific state information related to that application session. The application-level data and control messages are referred to data and control messages of various protocols utilized in Layer 3 and/or higher layers of the seven-layer OSI model of computer networking. Protocols utilized in Layer 3 and/or higher layers may comprise Internet Protocol (IP), Distance Vector Multicast Routing Protocol (DVMRP), Internet Control Message Protocol (ICMP) and/or Internet Group Multicast Protocol (IGMP). Depending on specific application-level protocols utilized in the existing application session, the IP gateway 130 may be operable to route corresponding application-level control messages in the existing application session, for example, H.245 control messages, RTP Control (RTPC) messages, Resource Reservation Protocol (RSVP) messages, Internet Group Management Protocol (IGMP) messages, and/or Internet Control Message Protocol (ICMP) messages.

In various exemplary embodiments of the invention, the IP gateway 130 may be operable to measure or compute individual network round-trip delays (RTDs) associated with the attached networks such as the WAN 110 and the LAN 120. In this regard, application-level control messages in the existing application session between the client device 142 and the client device 150, for example, may be utilized by the IP gateway 130 so as to measure the individual network RTDs. For example, upon transmission and/or reception of the application-level control messages in the existing application session between client devices such as the client device 142 and the client device 150, the IP gateway 130 may be configured to time stamp the application-level control messages. The resulting gateway related time stamps may be stored by the IP gateway 130. The IP gateway 130 may also extract various client related time stamps and processing delays from the application-level control messages. The extracted client related time stamps and/or processing delays may be stored. The IP gateway 130 may utilize the stored time stamps and processing delays to measure or calculate the individual network RTDs associated with the attached networks such as the WAN 110 and the LAN 120. The IP gateway 130 may be located in a residential location and/or non-residential locations comprising, for example, a commercial building, an office, an office complex, an apartment building and/or a factory.

A client device such as the client device 150 may comprise suitable logic, circuitry, interfaces and/or code that are operable to receive services from broadband IP networks attached through the IP gateway 130. Depending on client device capabilities, a client device may be attached or associated to different broadband IP networks in order to receive services. For example, the client devices 142-144, and the client devices 150-160 may be attached to the WAN 110 and the LAN 120, respectively. A client device may be attached to a network directly or indirectly. For example, the client device 150 may be attached to the LAN 120 directly. However, the client devices 160a-160c may be attached or associated to the LAN 120 through the PBX 170 that may be configured to serve a particular business or office, for example. Client devices such as the client device 142 may be operable to communicate or exchange data and control messages with one or more other client devices such as the client device 150 through the IP gateway 130. In this regard, the client device 142 and the client device 150 may be configured to support various application-level control messages such as, for example, H.245 control messages, RTCP messages, RSVP messages, IGMP messages, and/or ICMP messages, compatible to application-level protocols utilized in an application session between the client device 142 and the client device 150.

In an exemplary operation, a client device such as the client device 142 attached to the WAN 110 may be operable to exchange information with other client devices such as the client device 150 attached to the LAN 120 over an associated application session. For example, the RTP may be utilized in the existing application session between the client device 142 and the client device 150 to support communications of a service. The client device 142 and the client device 150 may communicate RTP data and RTCP messages in the existing application session via the IP gateway 130 to receive the service. In this regard, upon reception and/or transmission of the RTCP messages in the existing application session, the IP gateway 130 may time stamp the RTCP messages. The resulting gateway related time stamps may be stored by the IP gateway 130. The IP gateway 130 may also extract client related time stamps and/or processing delays from the RTCP messages encountered. The extracted client related time stamps and/or processing delays may be stored in the IP gateway 130. The IP gateway 130 may then utilize the stored time stamps and/or processing delays to measure or calculate individual network RTDs associated with the attached networks such as the WAN 110 and the LAN 120.

Figure 2:
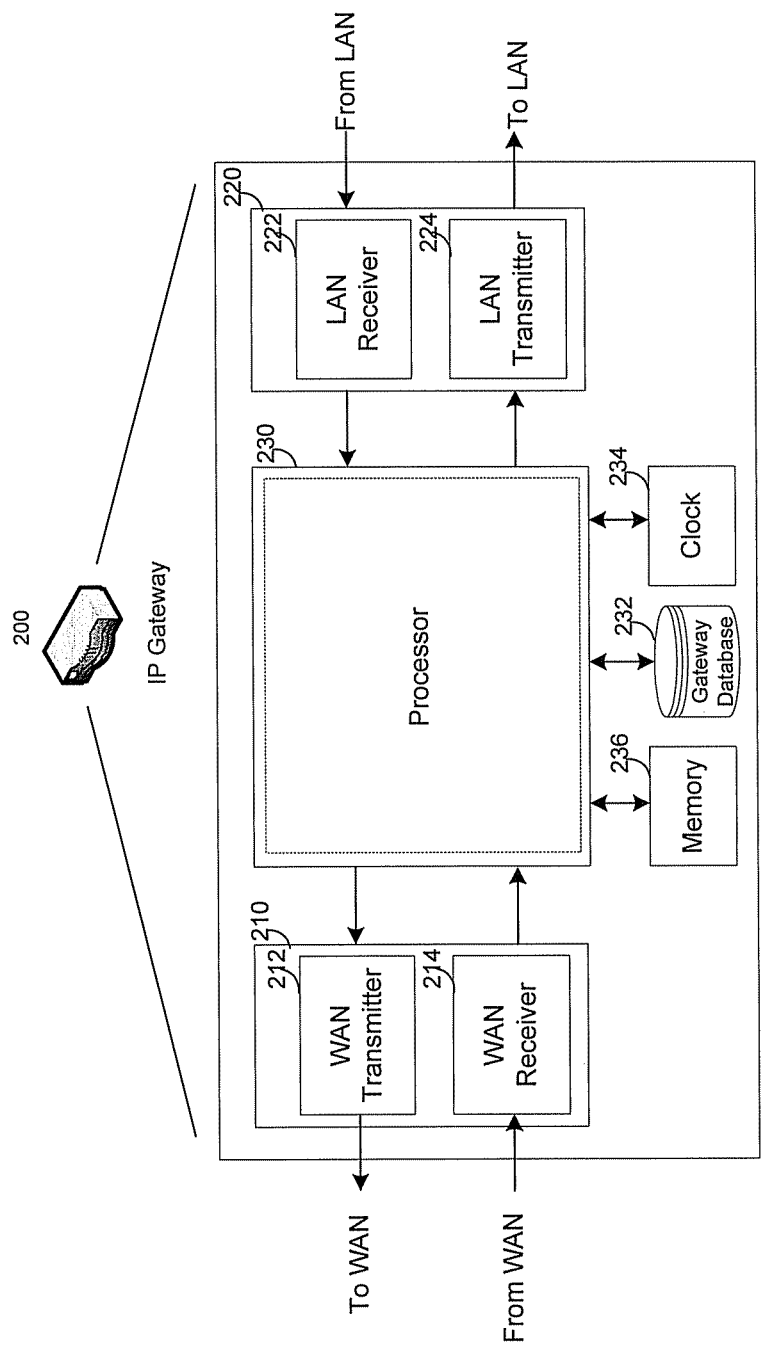
FIG. 2 is a diagram illustrating an exemplary IP gateway that is operable to measure individual LAN and WAN round-trip delays in an IP gateway utilizing application-level control messages in existing application sessions, in accordance with an embodiment of the invention.

FIG. 2 is a diagram illustrating an exemplary IP gateway that is operable to measure individual LAN and WAN round-trip delays in an IP gateway utilizing application-level control messages in existing application sessions, in accordance with an embodiment of the invention. Referring to FIG. 2, there is shown an IP gateway 200 comprising a WAN transceiver 210, a LAN transceiver 220, a processor 230, a gateway database 232, a clock 234 and a memory 236.

The WAN transceiver 210 may comprise suitable logic, circuitry, interfaces and/or code that are operable to communicate radio frequency signals using wireless wide area network technology. The WAN transceiver 210 may utilize the WAN transmitter 212 to transmit radio frequency signals to the WAN 110. Radio frequency signals from the WAN 110 may be received via the WAN receiver 214.

The LAN transceiver 220 may comprise suitable logic, circuitry, interfaces and/or code that are operable to communicate radio frequency signals using wireless local area network technology. The LAN transceiver 220 may utilize the LAN transmitter 224 to transmit radio frequency signals to the LAN 120. Receive radio frequency signals from the LAN 120 may be received via the LAN receiver 222.

The processor 230 may comprise suitable logic, circuitry and/or code that may be enabled to process signals communicated with the WAN transceiver 210 and/or the LAN transceiver 220. The communicated signals may comprise data and control messages routed or distributed among client devices registered to the IP gateway 200 via attached networks such as the WAN 110 and/or the LAN 120. In this regard, the processor 230 may route or distribute application-level data and control messages in existing application sessions between client devices such as the client device 142 and the client device 150. The processor 230 may time stamp the application-level control messages whenever transmission or reception of the application-level control messages occurs at the IP gateway 200. The resulting gateway related time stamps may be stored into the gateway database 232. Information in the time stamp field of the application-level control messages may be extracted and may be stored in the gateway database 232. The extracted information in the time stamp field of the application-level control messages may comprise client related time stamps and/or processing delays, for example, transmit origination time stamp, transmit time stamp, receive time stamp, and/or message processing time delays. The processor 230 may utilize the stored time stamps and/or processing time delays to measure or compute individual network RTDs associated with the WAN 110 and the LAN 120.

The gateway database 232 may comprise suitable logic, circuitry, interfaces and/or code that may be operable to manage and store data related to, for example, various time stamps and/or processing time delays associated with application-level control messages in existing application sessions. The stored time stamps may comprise transmit origination time stamp, transmit time stamp and/or receive time stamp. The gateway database 232 may be updated or refined whenever actions such as transmission and reception with regard to the application-level control messages occur at the IP gateway 200.

The clock 234 may comprise suitable logic, circuitry and/or code that are operable to provide clock timing for use in the IP gateway 200. The clock 234 may be enabled to capture or record time instants upon transmission or reception, at the IP gateway 200, of application-level control messages in existing application sessions. The values of the captured time instants may be utilized to time stamp the application-level control messages in the existing application sessions.

The memory 236 may comprise suitable logic, circuitry, interfaces and/or code that may be operable to store information such as executable instructions and data that may be utilized by the processor 230 and/or other associated component units such as, for example, the WAN transceiver 210 and the LAN transceiver 220. The memory 236 may comprise RAM, ROM, low latency nonvolatile memory such as flash memory and/or other suitable electronic data storage.

In an exemplary operation, the IP gateway 200 may be operable to route data and control messages in an application session between the client device 142 and the client device 150, for example. The IP gateway 200 may utilize the WAN transceiver 210 to communicate the application-level data and control messages with the client device 142 over the WAN 110. The IP gateway 200 may utilize the LAN transceiver 220 to communicate the application-level data and control messages with the client device 150 over the LAN 120. The clock 234 may maintain timing and capture time instants whenever transmission and/or reception of the application-level control messages occur at the IP gateway 200. The IP gateway 200 may utilize the values of the captured time instants from the clock 234 to time stamp the application-level control messages, for example. The resulting gateway related transmit or receive time stamps may be stored into the gateway database 232. The IP gateway 200 may also extract information in the time stamp field of the application-level control messages, and may store the extracted information in the gateway database 232. The extracted information may comprise various client related time stamps and/or processing time delays. The processor 230 may utilize the stored time stamps and/or processing time delays to measure or compute individual network RTDs associated with the attached networks such as the WAN 110 and the LAN 120.

Figure 3:
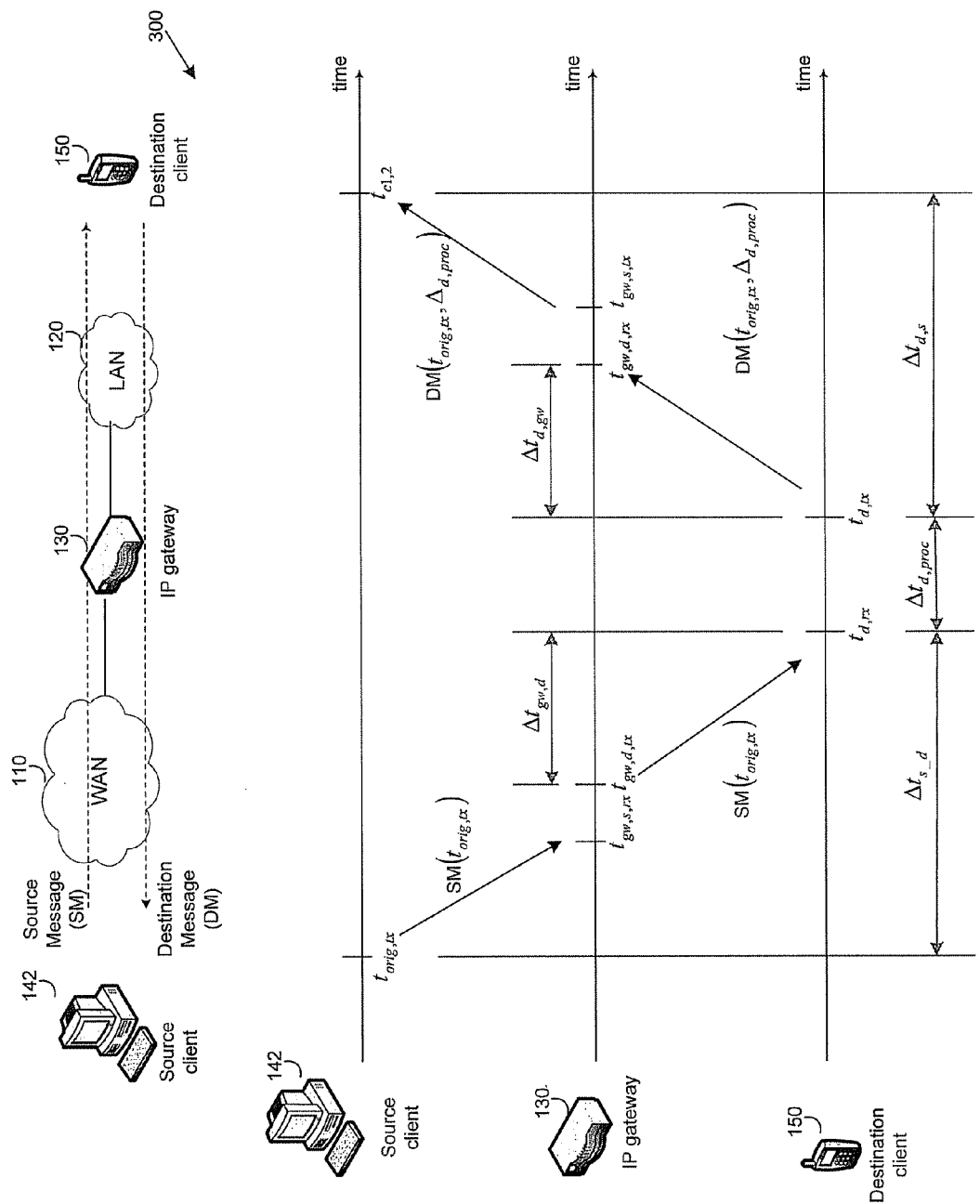
FIG. 3 is a block diagram illustrating exemplary timing diagram for measuring individual network round-trip delays in an IP gateway, in accordance with an embodiment of the invention.

FIG. 3 is a block diagram illustrating exemplary timing diagram for measuring individual network round-trip delays in an IP gateway, in accordance with an embodiment of the invention. Referring to FIG. 3, there is shown a timing diagram 300 for measuring individual network RTDs. Assume that at least one application session exists between a source client device such as the client device 142 and a destination device such as the client device 150 to support communications of a service. An end-to-end RTD over the existing application session for the source client device 142 may comprise the total time taken for a packet or a message such as an application-level control message to travel from the source client device 142 to the destination client device 150 and back from the destination client device 150 to the source client device 142. A packet or a message such as an application-level control message which originates at the source client device 142 and is communicated to the destination client device 150 may be referred to a source-to-destination message (SDM). A message such as an application-level control message which originates at the destination client device 150 and is communicated to the source client device 142 may be referred to a destination-to-source message (DSM).

The procedure for measuring individual network RTDs associated with the attached networks such as the LAN 120 may start with the source client device 142. The source client device 142 may transmit a SDM to the destination client device 150 via the IP gateway 130. The SDM may comprise a transmit origination time stamp, $t_{orig,tx}$, corresponding to a time instant upon transmission of the SDM from the source client device 142. The IP gateway 130 may time stamp the SDM using a gateway-source receive time stamp $t_{gw,s,rx}$ upon receiving the SDM from the source client device 142 via the WAN receiver 214. The gateway-source receive time stamp $t_{gw,s,rx}$ corresponds to a time instant upon reception of the SDM from the source client device 142. The IP gateway 130 may extract the transmit origination time stamp $t_{orig,tx}$ from the received SDM. The gateway-source receive time stamp $t_{gw,s,rx}$ and the extracted transmit origination time stamp $t_{orig,tx}$ may be stored in the gateway database 232.

The IP gateway 130 may process the received SDM for transmission to the destination client device 150. In this regard, the IP gateway 130 may time stamp the processed SDM using a gateway-destination transmit time stamp $t_{gw,d,tx}$ upon transmission of the processed SDM to the destination client device 150 via the LAN transmitter 224. The gateway-destination transmit time stamp $t_{gw,d,tx}$ indicates a time instant corresponding to the transmission of the processed SDM. The gateway-destination transmit time stamp $t_{gw,d,tx}$ may be stored in the gateway database 232. The destination client device 150 may receive the processed SDM from the IP gateway 130 at a time instant $t_{d,rx}$.

The destination client device 150 may determine the processing delay $\Delta t_{d,proc}$ associated with the received SDM. The destination client device 150 may then transmit a DSM to the source client device 142 via the IP gateway 130 in response to the received SDM from the source client device 142. In this regard, the DSM may comprise the transmit origination time stamp $t_{orig,tx}$ extracted from the received SDM, and the measured processing delay $\Delta t_{d,proc}$. Upon receiving the DSM from the destination client device 150 via the LAN receiver 222, the IP gateway 120 may time stamp the DSM using a gateway-destination receive time stamp $t_{gw,d,rx}$ upon receiving the DSM via the LAN receiver 222 from the destination client device 150.

The IP gateway 130 may extract transmit origination time stamp information $t_{orig,tx}^{extr}$ from the received DSM. The IP gateway 120 may compare the extracted transmit origination time stamp information $t_{orig,tx}^{extr}$ with the stored transmit origination time stamp $t_{orig,tx}$ in the gateway database 232. If the extracted transmit origination time stamp $t_{orig,tx}^{extr}$ matches the stored transmit origination time stamp $t_{orig,tx}$, the IP gateway 120 may process the received DSM for transmission to the source client device 142. In this regard, the IP gateway 120 may time stamp the processed DSM using a gateway-source transmit time stamp $t_{gw,s,tx}$ upon transmission of the processed DSM to the source client device 142 via the WAN transmitter 212. The gateway-source transmit time stamp $t_{gw,s,tx}$ may be stored in the gateway database 232. A gateway processing delay $t_{gw}$ associated with the end-to-end RTD between the source client device 142 and the destination client device 150 may be calculated or determined utilizing the following relationship:

$$t_{gw} = (t_{gw,s,tx} - t_{gw,d,rx}) + (t_{gw,d,tx} - t_{gw,d,rx}).$$

An individual network $RTD_{DNW}$ associated with a network coupled between the IP gateway 130 and the destination client device 150 may be calculated or determined utilizing the following relationship:

$$RTD_{DNW} = t_{gw,d,rx} - t_{gw,s,tx} - t_{d,proc}.$$

Although an individual RTD associated with the LAN 120 between the IP gateway 130 and the client device 150 is determined or calculated in FIG. 3, the invention may not be so limited. Accordingly, by switching the source-destination role for the client device 142 and the client device 150 over the existing application session, the invention may be applied to compute an individual RTD associated with the WAN 110 without departing from the spirit and scope of various embodiments of the invention.

Figure 4:
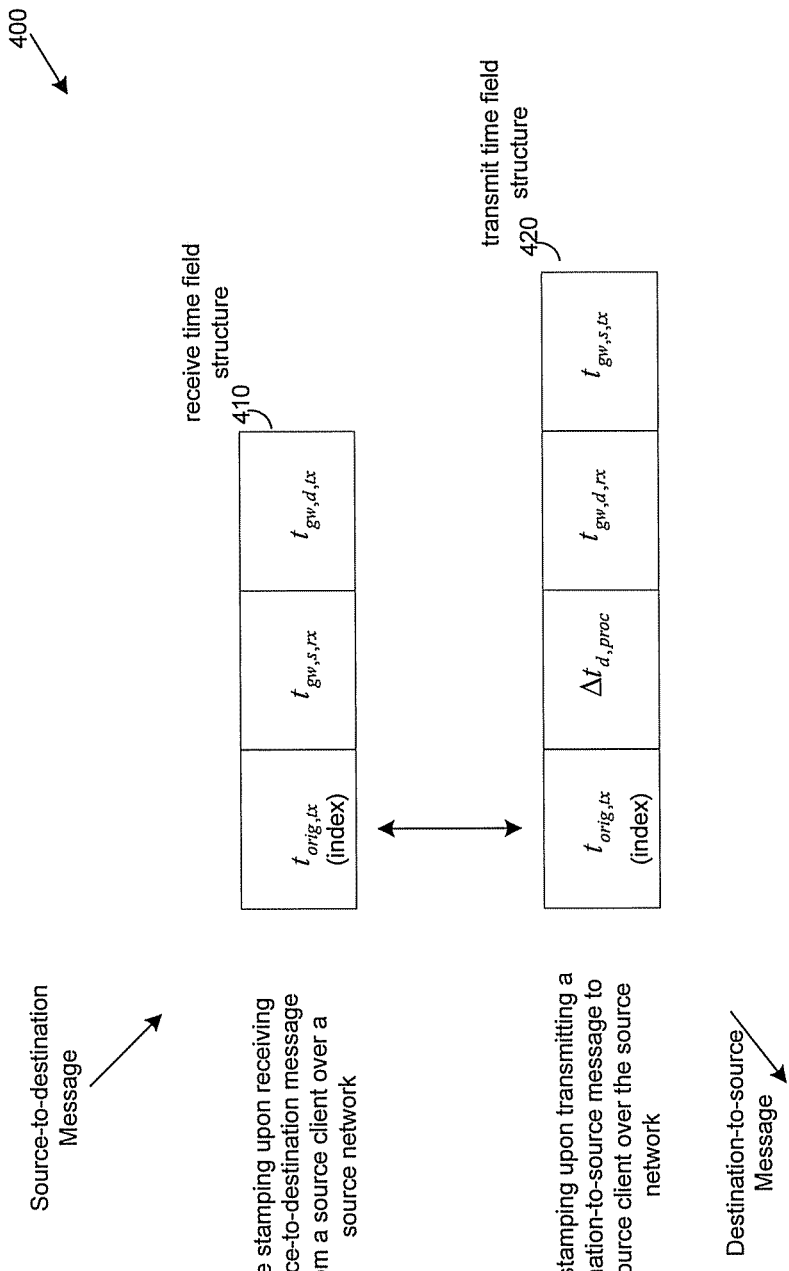
FIG. 4 is a block diagram illustrating exemplary gateway data structure for measuring individual network round-trip delays in an IP gateway, in accordance with an embodiment of the invention.

FIG. 4 is a block diagram illustrating exemplary gateway data structure for measuring individual network round-trip delays in an IP gateway, in accordance with an embodiment of the invention. Referring to FIG. 4, there is shown a gateway data structure 400 comprising a receive time field structure 410 and a transmit time field structure 420. Assuming that at least one application session exists between a source client device such as the client device 142 and a destination device such as the client device 150 to support communications of a service. Data and control messages may be routed, via the IP gateway 130, between the source client device 142 and the destination client device 150. In an exemplary embodiment of the invention, the receive time field structure 410 may represent a time stamp field format for maintaining information related to a SDM received by the IP gateway 130 from the source client device 142. The receive time field structure 410 may comprise the transmit origination time stamp $t_{orig,tx}$, the gateway-source receive time stamp $t_{gw,s,rx}$ and the gateway-destination transmit time stamp $t_{gw,d,tx}$. The transmit origination time stamp $t_{orig,tx}$ corresponds to a time instant upon transmission of the SDM from the source client device 142 to the destination client device 150 via the IP gateway 130. The gateway-source receive time stamp $t_{gw,s,rx}$ corresponds to a time instant upon receiving, by the IP gateway 130, the SDM from the source client device 142 via the WAN receiver 214. The gateway-destination transmit time stamp $t_{gw,d,tx}$ corresponds to a time instant upon transmission, by the IP gateway 130, to the destination client device 150 via the LAN transmitter 224.

In another exemplary embodiment of the invention, the transmit time field structure 420 may represent a time stamp field format for maintaining information related to a DSM received by the IP gateway 130 from the destination client device 150. The transmit time field structure 420 may comprise the transmit origination time stamp $t_{orig,tx}$ followed by the processing delay $\Delta t_{d,proc}$, the gateway-destination receive time stamp $t_{gw,d,rx}$, and the gateway-source transmit time stamp $t_{gw,s,tx}$. The transmit origination time stamp $t_{orig,tx}$ corresponds to a time instant upon transmission of a SDM from the source client device 142 to the destination client device 150 via the IP gateway 130. The gateway-destination receive time stamp $t_{gw,d,rx}$ corresponds to a time instant upon receiving, by the IP gateway 130, the DSM from the destination client device 150 via the LAN receiver 222. The gateway-source transmit time stamp $t_{gw,s,tx}$ corresponds to a time instant upon transmission, by the IP gateway 130, to the source client device 142 via the WAN transmitter 212. The processing delay $\Delta t_{d,proc}$ represents the processing delay, measured by the destination client device 150, associated with the SDM received from the source client device 142.

Figure 5:
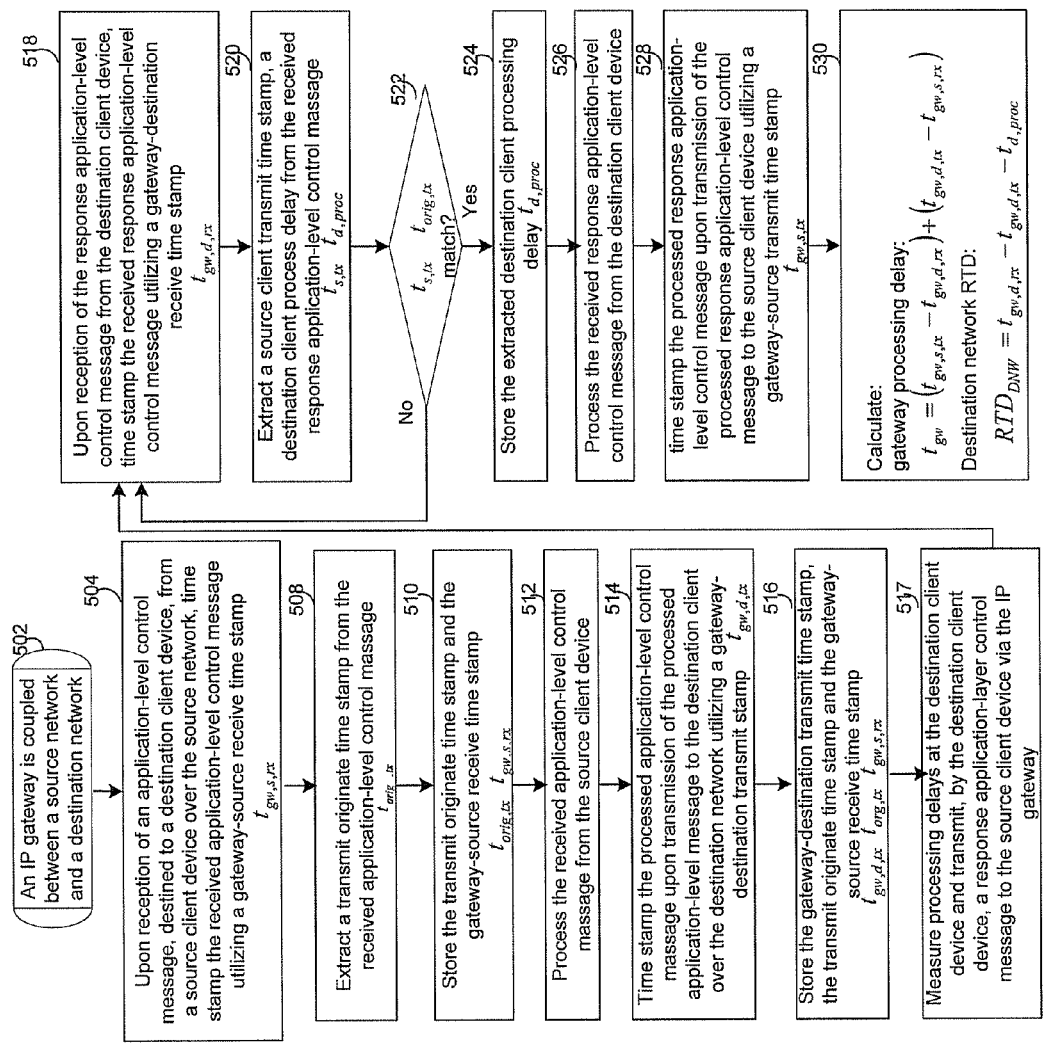
FIG. 5 is a block diagram illustrating exemplary steps that may be performed in an IP gateway to measure individual network round-trip delays utilizing application-level control messages in existing application sessions, in accordance with an embodiment of the invention.

FIG. 5 is a block diagram illustrating exemplary steps that may be performed in an IP gateway to measure individual network round-trip delays utilizing application-level control messages in existing application sessions, in accordance with an embodiment of the invention. Referring to FIG. 5, the exemplary steps start with step 502. In step 502, an IP gateway such as the IP gateway 200 is coupled between a source network and a destination network. Assuming that an application session exists between a source client device such as the client device 142 that is attached to the WAN 110, and a destination client device such as the client device 150 that is attached to the LAN 120. In step 504, the IP gateway may be operable to route or distribute data and control messages in the existing application session. Upon reception of an application-level control message that is destined to the destination client device 150 from the source client device 142, the IP gateway 200 may time stamp the received application-level control message utilizing a gateway-source receive time stamp $t_{gw,s,rx}$. In step 508, the IP gateway 200 may extract transmit origination time stamp $t_{orig,tx}$ from the received application-level control message. In step 510, the IP gateway 200 may store the transmit origination time stamp $t_{orig,tx}$ and the gateway-source receive time stamp $t_{gw,s,rx}$ to the gateway database 232. In step 512, the IP gateway 200 may be operable to process the received application-level control message for transmission to the destination client device 150.

In step 514, upon transmission of the processed application-level message to the destination client 150, the IP gateway 200 may be operable to time stamp the processed application-level control massage utilizing a gateway-destination transmit stamp $t_{gw,d,tx}$. In step 516, the IP gateway 200 may be operable to store the gateway-destination transmit time stamp $t_{gw,d,tx}$, the transmit origination time stamp $t_{org,tx}$ and the gateway-source receive time stamp $t_{gw,s,tx}$ into the gateway database 232. In step 517, the destination client device 150 may receive, at a time instant $t_{d,rx}$, the application-level control message which originates at the source client device 142. The destination client device 150 may then measure processing delay $\Delta t_{d,proc}$ associated with the received application-level control message from the source client device 142. The destination client device 150 may transmit an application-level message to the source client device 142 via the IP gateway 130 in response to the received application-level control message from the source client device 142. In this regard, the response application-level control message which originates at the destination client device 150 may comprise the transmit origination time stamp $t_{orig,tx}$ and the measured processing delay $\Delta t_{d,proc}$.

In step 518, the IP gateway 200 may receive the response application-level control message from the destination client device 150 via the LAN receiver 222. Upon reception of the response application-level control message which originates at the destination client device 150, the IP gateway 200 may time stamp the received response application-level control message utilizing a gateway-destination receive time stamp $t_{gw,d,rx}$. In step 520, the IP gateway 200 may extract source client transmit time stamp information $t_{s,tx}$, a destination client process delay $t_{d,proc}$ from the received response application-level control massage. In step 522, it may be determined whether the extracted source client transmit time stamp information $t_{s,tx}$ matches the stored transmit origination time stamp $t_{orig,tx}$ in the gateway database 232. In instances where the extracted source client transmit time stamp information $t_{s,tx}$ matches the stored transmit origination time stamp $t_{orig,tx}$ in the gateway database 232, then in step 524, the IP gateway 200 may store the extracted destination client process delay $t_{d,proc}$ into the gateway database 232. In step 526, the IP gateway 200 may then process the received response application-level control message for transmission to the source client device 142. In step 528, the IP gateway 200 may be operable to time stamp the processed response application-level control message from the destination client device 150 upon transmission of the processed response application-level control message to the source client device 142 utilizing a gateway-source transmit time stamp $t_{gw,s,tx}$. In step 530, the IP gateway may be operable to determine the gateway processing delay $t_{gw}$ and individual destination network RTD utilizing the stored time stamps. For example, the gateway-source transmit time stamp may be calculated or determined utilizing the following relationship:

$$t_{gw}=(t_{gw,s,tx}-t_{gw,d,rx})+(t_{gw,d,tx}-t_{gw,s,rx}), \text{ and}$$

the destination network RTD may be calculated or determined utilizing the following relationship:

$$RTD_{DNW}=t_{gw,d,rx}-t_{gw,d,tx}-t_{d,proc}$$

In step 522, in instances where the extracted source client transmit time stamp information $t_{s,tx}$ does not match the stored transmit origination time stamp $t_{orig,tx}$ in the gateway database 232, then the exemplary steps may return to step 518.

In various exemplary aspects of the method and system for measuring network round-trip delays in IP gateways, an IP gateway such as the IP gateway 130 is attached to a source network such as the WAN 110 and a destination network such as the LAN 120. The IP gateway 130 may be operable to handle various application sessions such as an application session established between a source client device such as the client device 142 and a destination client device such as the client device 150. The source client device 142 and the destination client device 150 may be associated with the WAN 110 and the LAN 120, respectively. The source client device 142 and the destination client device 150 may communicate various application-level data and control messages over the existing application session via the IP gateway 130. In this regard, the IP gateway 130 may be operable to time stamp one or more application-level control messages utilized in the existing application session.

The one or more application-level control messages may be utilized by client device such as the source client device 142 to calculate an end-to-end RTD over the existing application session. The IP gateway 130 may be operable to calculate individual network RTDs associated with the attached networks such as the WAN 110 and the LAN 120 utilizing the resulting time stamps. The procedure to determine the end-to-end RTD over the existing application session for the source client device 142 may start with transmission of one of the application-level control messages. The application-level control message may be transmitted with a transmit origination time stamp from the source client device 142 to the destination client device 150 via the IP gateway 130. The IP gateway 130 may utilize the WAN receiver 214 to receive the application-level control message from the source client device 142 over the WAN 110. The IP gateway 130 may time stamp the received application-level control message upon reception. The transmit origination time stamp, embedded in the received application-level control message, may be extracted by the IP gateway 130 and stored, for example, in the gateway database 232.

The received application-level control message from the source client device 142 may be processed so that it may be transmitted to the destination client device 150. The IP gateway 130 may time stamp the processed application-level control message, upon transmission to the destination client device 150, utilizing a gateway destination transmit time stamp. The destination client device 150 may be operable to determine processing delays associated with the received application-level control message from the source client device 142. In response, the destination client device gateway 150 may transmit another one of the application-level control messages to the source client device 142 via the IP gateway 130. The application-level control message which originates at the destination client device 150 and is communicated to the source client device 142 via the IP gateway 130 may comprise the processing delay measurement at the destination client device 150. The IP gateway 130 may be operable to time stamp the application-level control message received from the destination client device upon reception.

The transmit origination time stamp information in the received application-level control message which originates at the destination client device 150 and is communicated to the source client device 142 may be compared with the transmit origination time stamp from the source client device. In instances where the transmit origination time stamp information from the destination client device 150 matches the transmit origination time stamp from the source client device 142, the IP gateway 130 may be operable to process the application-level control message received from the destination client device 150. The IP gateway 130 may time stamp the processed application-level control message from the destination client device 150 utilizing a gateway source transmit time stamp. An individual RTD associated with the destination network, that is the LAN 120, may be calculated or determined utilizing the gateway destination receive time stamp, the gateway destination transmit time stamp and the processing delay measurement.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for measuring individual network round-trip delays in IP gateways.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
   in an IP gateway that is communicatively coupled to a source network and a destination network, wherein said IP gateway is configured to handle an application session between a source client device associated with said source network and a destination client device associated with said destination network:
   time stamping, by said IP gateway, a plurality of application-level control messages for said application session, comprising time stamping a first application-level control message received by said IP gateway with a first time stamp, and a second application-level control message transmitted by said IP gateway with a second time stamp; and
   calculating a network round-trip delay associated with said source network or said destination network based on said first time stamp, said second time stamp and a corresponding process delay of said source client device or said destination client device.

2. The method according to claim 1, comprising receiving one of said plurality of application-level control messages that originated from said source client device.

3. The method according to claim 2, comprising time stamping, upon said receiving, said one of said plurality of application-level control messages.

4. The method according to claim 3, comprising extracting, subsequent to said time stamping, a transmit origination time stamp from said received one of said plurality of application-level control messages.

5. The method according to claim 4, comprising:
   processing said received one of said plurality of application-level control messages; and
   time stamping, upon transmission to said destination client device from said IP gateway, said processed one of said plurality of application-level control messages utilizing a gateway destination transmit time stamp.

6. The method according to claim 5, wherein said destination client device:
   measures a processing delay for said one of said plurality of application-level control messages that is received from said IP gateway; and
   transmits another one of said plurality of application-level control messages to said source client device via said IP gateway, wherein said transmitted another one of said plurality of application-level control messages comprises said processing delay measurement.

7. The method according to claim 6, comprising:
   receiving said another one of said plurality of application-level control messages; and
   time stamping said received another one of said plurality of application-level control messages utilizing a gateway destination receive time stamp.

8. The method according to claim 7, comprising comparing transmit origination time stamp information of said received another one of said plurality of application-level control messages with said transmit origination time stamp.

9. The method according to claim 8, comprising extracting said processing delay measurement from said received another one of said plurality of application-level control messages based on said comparison.

10. The method according to claim 9, comprising:
    processing said received another one of said plurality of application-level control messages;
    time stamping said processed another one of said plurality of application-level control messages upon transmission to said source client device utilizing a gateway source transmit time stamp; and
    calculating a round-trip delay associated with said destination network utilizing said gateway destination receive time stamp, said gateway destination transmit time stamp and said processing delay measurement.

11. A system for communication, the system comprising:
an IP gateway comprising processing circuitry that is communicatively coupled to a source network and a destination network, wherein said IP gateway is configured to handle an application session between a source client device associated with said source network and a destination client device associated with said destination network, said IP gateway being configured to:
time stamp, by said IP gateway, a plurality of application-level control messages for said application session, comprising time stamping a first application-level control message received by said IP gateway with a first time stamp, and a second application-level control message transmitted by said IP gateway with a second time stamp; and
calculate a network round-trip delay associated with said source network or said destination network based on said first time stamp, said second time stamp and a corresponding process delay of said source client device or said destination client device.

12. The system according to claim 11, wherein said IP gateway is further configured to receive one of said plurality of application-level control messages that originated from said source client device.

13. The system according to claim 12, wherein said IP gateway is further configured to time stamp, upon said receiving, said one of said plurality of application-level control messages.

14. The system according to claim 13, wherein said IP gateway is further configured to extract, subsequent to said time stamping, a transmit origination time stamp from said received one of said plurality of application-level control messages.

15. The system according to claim 14, wherein said IP gateway is further configured to process said received one of said plurality of application-level control messages; and time stamp, upon transmission to said destination client device from said IP gateway, said processed one of said-plurality of application-level control messages utilizing a gateway destination transmit time stamp.

16. The system according to claim 15, wherein said destination client device is configured to:
measure processing delay for said one of said plurality of application-level control messages that is received from said IP gateway; and
transmit another one of said plurality of application-level control messages to said source client device via said IP gateway, wherein said transmitted another one of said plurality of application-level control messages comprises said processing delay measurement.

17. The system according to claim 16, wherein said IP gateway is further configured to:
receive said another one of said plurality of application-level control messages; and
time stamping said received another one of said plurality of application-level control messages utilizing a gateway destination receive time stamp.

18. The system according to claim 17, wherein said IP gateway is further configured to compare transmit origination time stamp information of said received another one of said plurality of application-level control messages with said transmit origination time stamp.

19. The system according to claim 18, wherein said IP gateway is further configured to
process said received another one of said-plurality of application-level control messages;
time stamp said processed another one of said plurality of application-level control messages upon transmission to said source client device utilizing a gateway source transmit time stamp; and
calculate a round-trip delay associated with said destination network utilizing said gateway destination receive time stamp, said gateway destination transmit time stamp and said processing delay measurement.

20. A non-transitory computer-readable medium embodying a program executable in at least one internet protocol (IP) gateway that is communicatively coupled to a source network and a destination network, said IP gateway configured to handle an application session between a source client device associated with said source network and a destination client device associated with said destination network, said application comprising code that causes the IP gateway to:
time stamp a plurality of application-level control messages utilized for said application session, comprising time stamping a first application-level control message received by said IP gateway with a first time stamp, and a second application-level control message transmitted by said IP gateway with a second time stamp; and
calculate a network round-trip delay associated with said source network or said destination network based on said first time stamp, said second time stamp and a corresponding process delay of said source client device or said destination client device.

* * * * *